(12) United States Patent
Maldavs

(10) Patent No.: US 7,584,764 B2
(45) Date of Patent: Sep. 8, 2009

(54) COAXIAL QUICK DISCONNECT COUPLING

(75) Inventor: Ojars Maldavs, Lincoln, NE (US)

(73) Assignee: Parker-Hannifin Corporation, Cleveland, OH (US)

( * ) Notice: Subject to any disclaimer, the term of this patent is extended or adjusted under 35 U.S.C. 154(b) by 197 days.

(21) Appl. No.: 11/593,409

(22) Filed: Nov. 6, 2006

(65) Prior Publication Data
US 2007/0102050 A1   May 10, 2007

Related U.S. Application Data

(62) Division of application No. 10/795,599, filed on Mar. 8, 2004, now Pat. No. 7,147,003.

(60) Provisional application No. 60/475,289, filed on Jun. 3, 2003, provisional application No. 60/491,657, filed on Jul. 29, 2003.

(51) Int. Cl.
*F16L 37/32* (2006.01)
(52) U.S. Cl. .............................. 137/15.18; 137/614.03; 137/614.04; 285/123.1; 285/124.1
(58) Field of Classification Search .................... 137/1, 137/15.18, 614.03–614.05; 285/120.1, 123.1, 285/121.1, 124.1
See application file for complete search history.

(56) References Cited

U.S. PATENT DOCUMENTS

| | | | |
|---|---|---|---|
| 2,471,798 A | 11/1949 | Thomas | |
| 3,211,178 A | 10/1965 | Kiszko | |
| 3,820,827 A | 6/1974 | Boelkins | |
| 4,269,219 A * | 5/1981 | Dybvig | 137/614.03 |
| 5,014,743 A | 5/1991 | Makishima | |
| 6,158,717 A | 12/2000 | Van Scyoc et al. | 137/614.03 |
| 6,170,522 B1 | 1/2001 | Tanida | 137/614.04 |
| 6,179,001 B1 | 1/2001 | Schutz | |
| 6,192,934 B1 | 2/2001 | Coates et al. | 137/614.04 |
| 6,659,130 B2 | 12/2003 | Arosio | 137/614.03 |

FOREIGN PATENT DOCUMENTS

| | | |
|---|---|---|
| WO | WO 82/03439 | 10/1982 |
| WO | WO8203439 A1 | 10/1982 |

\* cited by examiner

*Primary Examiner*—Kevin L Lee
(74) *Attorney, Agent, or Firm*—Daniel J. Whitman

(57) ABSTRACT

A method of fluidly connecting coaxially aligned first and second couplings (50, 130), wherein the both couplings (50, 130) have an inner high pressure passage (26) and a coaxial outer lower pressure passage (53). Initially the first coupling inner high pressure passage (26) is fluidly connected with the first outer lower pressure passage (53) while isolating the second coupling inner high pressure passage (166) and the coaxial outer lower pressure passage (151). Then the first coupling inner high pressure passage (26) and one of the second coupling inner and outer passages (166, 151) is fluidly connected with the first coupling coaxial outer lower pressure passage (53) while isolating the other of the second coupling inner and outer passages (166, 151). Finally the first coupling inner high pressure passage (26) is fluidly connected with the second coupling inner high pressure passage (166) and the first coupling coaxial outer lower pressure passage (53) is fluidly connected with the second coupling coaxial outer lower pressure passage (151).

6 Claims, 12 Drawing Sheets

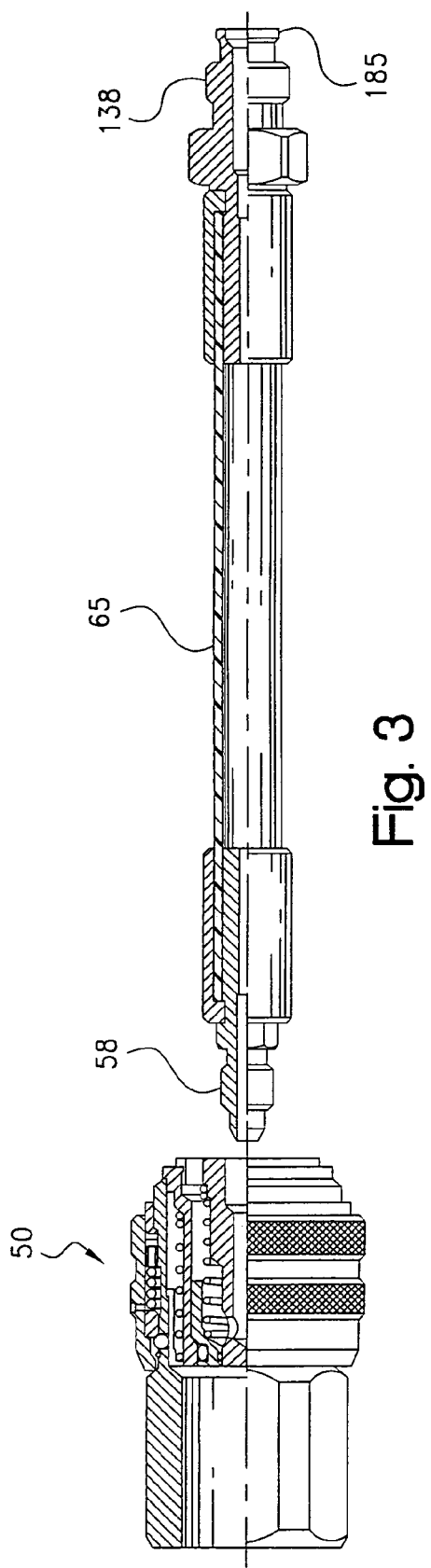
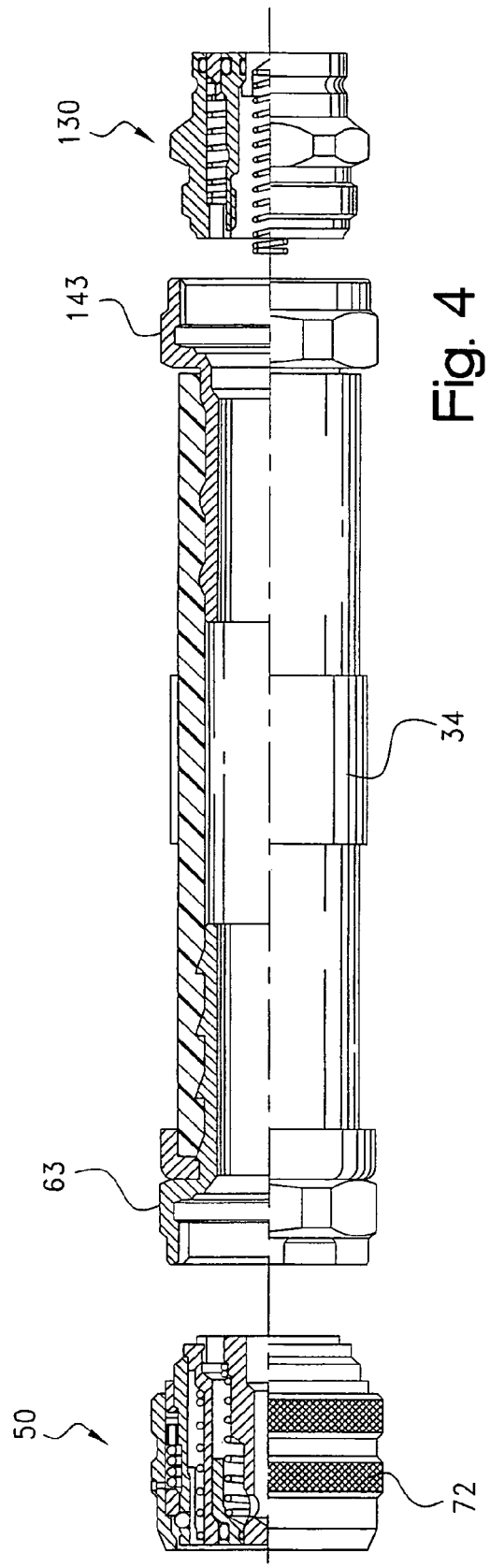
Fig. 3
Fig. 4

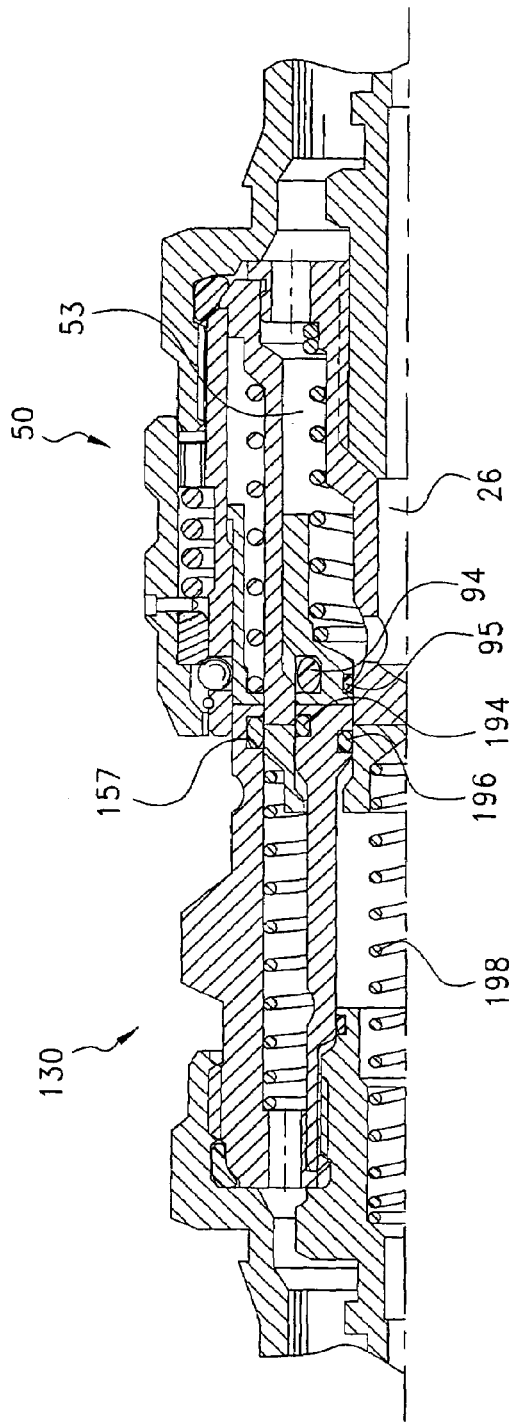
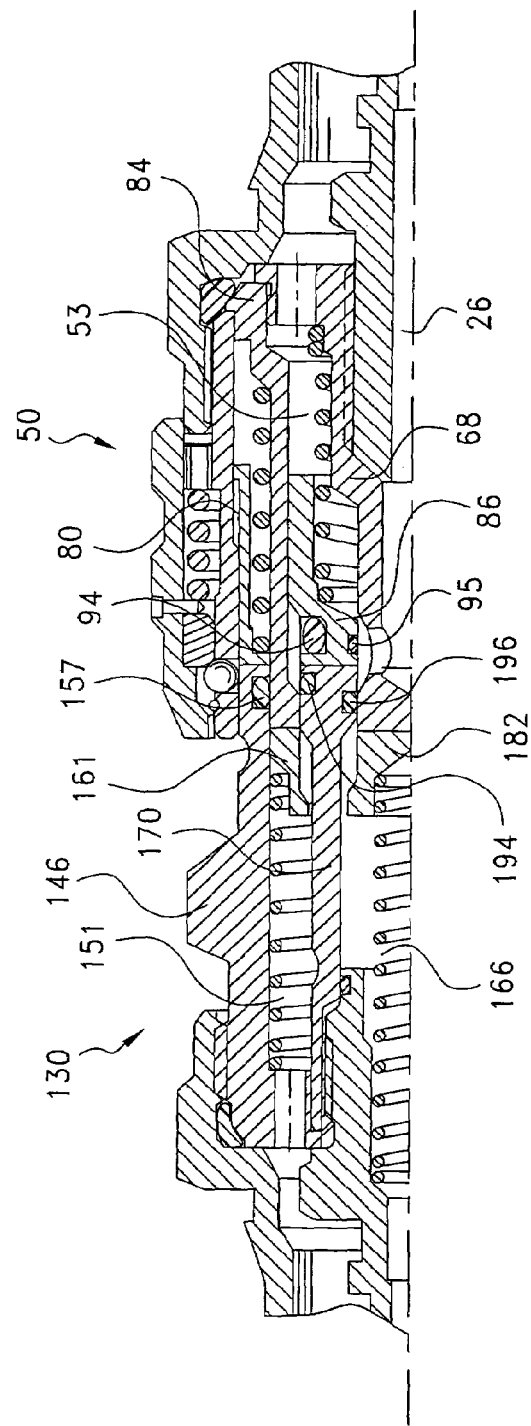

COAXIAL QUICK DISCONNECT COUPLING

CROSS-REFERENCE TO RELATED CASES

The present application is a divisional of application Ser. No. 10/795,599, filed Mar. 8, 2004 now U.S. Pat. No. 7,147,003, and claims the benefit of the filing date of U.S. Provisional Application Ser. No. 60/475,289 filed Jun. 3, 2003, and U.S. Provisional Application Ser. No. 60/491,657 filed Jul. 29, 2003, all of which are expressly incorporated herein by reference in their entirety.

FIELD OF THE INVENTION

The present invention relates to quick disconnect, concentric coaxial couplings and their attachment with mating hose assemblies.

BACKGROUND OF THE INVENTION

Coaxial couplings, particularly those which conduct high and low pressure fluids, are well known in the art. An example of such a coupling is shown in U.S. Pat. No. 6,179,001 B1 to Schutz. This type of coupling assembly permits a rapid-action connection of a male and female coupling that sealingly closes when the male and female halves are disconnected. Typically, these concentric, coaxial coupling are attached with coaxial hose assemblies.

Coaxial hose assemblies are generally used to conduct hydraulic fluid, for example, from a driving element such as a pump, to a hydraulically driven apparatus such as a tool and then return the hydraulic fluid back to a reservoir that supplies the pump with fluid. Typically, the concentric inner passage of both the hose assembly and coaxial coupling is filled with high pressure working fluid, while the outer concentric passage of both the hose assembly and coupling is filled with the low pressure return fluid.

Trapped pressurized fluid or flow impediments are harmful to the coaxial coupling assembly. Connection of the two halves is difficult if the pressure in either half has escalated due to trapped fluid. Sudden pressure surges within the hose assemblies can cause harm to all of the components. Therefore, it is desirable to control the fluid flow through the coupling halves and ensure that trapped pressurized fluid is properly dissipated without harming the assembly.

Coaxial couplings are comprised of a multitude of components. It is necessary to properly seal the areas where connections are made between the components to ensure that pressurized fluid does not escape. In addition, sudden pressure spikes within the assembly can extrude the seals that reside in and between the components.

At some point, due to age, misuse, etc., the conduit that provides the connection to the coaxial coupling halves will have to be replaced. It is cost prohibitive to replace both the conduit and its mating coaxial coupling. Some prior art patent structures combine the coaxial coupling and conduit into an integral assembly. The end fitting that attaches to the conduit is also a primary component of the coupling. Therefore, replacement of the hose assembly, which is comprised of the conduit and attached end fitting, is impractical without replacing the coupling.

Valving componentry is needed for the interconnection of fluid paths. It is desirable to provide an unimpeded connection so that a smooth fluid connection is achieved. Small passageways restrict the fluid flow and interrupt the smooth continuous passage of fluid. It is desirable to have a full passage at the mating halves of the male and female couplings immediately upon the connection. Passageways through the valving components can restrict the fluid flow and provide a hindrance to a smooth continuous flow.

The connector, or port, at the driving component, e.g. the pump, and the driven component, e.g. the tool, can have various configurations. Both twin-line and concentric coaxial connectors are commonly used at the port. Therefore, both mating twin line or concentric coaxial conduits are used. Since it is costly and inconvenient to carry both styles of mating coaxial couplings, it is desirable to have but one coaxial coupling that can mate with both the twin line and coaxial styled conduits.

Coaxial couplings are commonly used in unclean environments, with properly sealed components within the coaxial coupling, preventing outside contaminants from entering. If contaminants do enter, the joints and seals of the mating componentry can be adversely affected. The locking collar assembly of a quick disconnect, coaxial coupling functions with internal springs and locking componentry that are housed within a cavity isolated from outside contaminants. Thus, it is essential that seals between the mating and moving components not only prevent contaminants from entering, but also not hinder necessary movements between the components.

Since both of the male and female halves of the coaxial coupling are concentric, proper mating can only occur if they both remain concentric. Soft connecting joints between the components can allow one component to move radially relative to another, thus causing this coupling half to be eccentric. Strong, secure joints between the components ensure that one coupling half remains concentric and sealingly mates with the other half.

Prior art coaxial coupling have integrated the end fitting of the connecting hose assembly into the componentry of the coaxial coupling. Therefore the same component that is used as a functioning part of the male and/or female coaxial coupling connects with the conduit. Although this design reduces the number of components for the entire coaxial coupling assembly, i.e. the coaxial coupler with the hose assembly, it also eliminates any reusability of the coaxial coupling. For example, if one of the conduits fails during use of the coaxial coupling assembly, it is desirable to change only the failed conduit. This can not be done if the conduit is permanently attached with a component of the coaxial coupling. The entire coaxial coupling assembly has to be replaced in such a case, which adds cost for the enduser.

SUMMARY OF THE INVENTION

The present invention provides a method of fluidly connecting a first coaxial coupling and a second coaxial coupling, both having concentric inner and outer passages. The method initially fluidly connects the first coaxial coupling inner and outer passages with each other while isolating both of the inner and outer passages of the second coaxial coupling. The process then fluidly connects one of the second coaxial coupling inner and outer passages with one of the first coaxial coupling inner and outer passages. The process finally fluidly connects the first coaxial coupling inner passage with the second coaxial coupling inner passage and the first coaxial coupling outer passage with the second coaxial coupling outer passage. The noted method can also include the steps of conducting high pressure fluid via the first and second inner coupling passages and then conducting low pressure fluid via the first and second coupling outer passages.

Another feature of the present invention includes providing a method of fluidly connecting coaxially aligned first and second couplings wherein the first coupling has an inner high pressure passage and a coaxial outer lower pressure passage. The second coupling has an inner high pressure passage and a coaxial outer lower pressure passage. The method initially fluidly connects the first coupling inner high pressure passage with the first outer lower pressure passage while isolating the second coupling inner high pressure passage and the coaxial outer lower pressure passage. The method then fluidly connects the first coupling inner high pressure passage and one of the second coupling inner high pressure and outer lower pressure passages with the first coupling coaxial outer lower pressure passage while still isolating the other of the second coupling inner high pressure and low pressure passages. The method then finally fluidly connects the first coupling inner high pressure passage with the second coupling inner high pressure passage and the first coupling outer lower pressure passage with the second coupling outer lower pressure passage. Another feature of the present invention includes the noted method of connecting coaxially aligned first and second couplings while providing a continuous flow of high pressure fluid through the first coaxial coupling.

A further feature of the present invention includes providing a method of fluidly connecting coaxially aligned first and second couplings wherein both couplings have inner high pressure passages and coaxially outer lower pressure passages. The method initially connects the first coupling inner high pressure passage with the first coupling coaxial outer lower pressure passage while isolating the second coupling inner high pressure passage and the second coupling coaxial outer lower pressure passage. The method then fluidly connects both of the second coaxial coupling high and coaxial lower pressure passages with the first coaxial coupling outer lower pressure passage. The method then finally fluidly connects the first coupling inner high pressure passage with the second coaxial coupling inner high pressure passage and the first coaxial coupling outer low pressure passage wit the second coaxial coupling outer low pressure passage.

Still another feature of the present invention includes providing a method of operatively, fluidly and concentrically interconnecting adjoining proximate ends of self-contained subassemblies comprised of first and second coaxial coupling halves, with the distal end of each of said coupling halves being operatively, fluidly interconnected with a separate hose assembly. The hose assembly includes a flexible hose assembly having multiple conduits, each of said conduits being, in turn, connected with an individual hose fitting. The coupling halves, together with their respective hose assemblies form a coupling assembly between a driving member and a driven member. The noted method initially maintains an operative fluid connection between the concentric inner and outer passages of the first coupling half, which are connected via separate conduits and hose fittings to the driving member, while concurrently isolating concentric inner and outer passages of the second coupling half, which are connected via further separate conduits and hose fittings to the driven member. The method then fluidly connects one of the second coaxial coupling member inner and outer passages with one of the first coaxial coupling member inner and outer passages in order to relieve any residual pressure buildup in the second coaxial coupling member. The method finally fluidly interconnects the first and second coaxial coupling member inner passages and the first and second coaxial coupling member outer passages, thereby empowering the driven member.

Another feature of the present invention includes a quick disconnect coupler, having a male half for connection with a female half. The male half includes an inner passage, a concentric outer passage, an outer cylindrical plug having a plurality of flow passages longitudinally extending therethrough, a cylindrical outer sleeve, received within and axially moveable relative to the cylindrical plug, a cylindrical valve body positioned within and axially moveable relative to the cylindrical outer sleeve from a first position in which the outer surface of the valve body is sealed against the inner surface of the sleeve to a second position in which the outer surface of the valve body is out of contact with the inner surface of the sleeve, and an inner valve element positioned within and axially moveable relative to the valve body. The inner valve is moveable from a first position in which the outer surface of the inner valve element is sealed against the inner surface of the valve body to a second position in which the outer surface of the inner valve element is out of contact with the inner surface of the valve body. The female half includes an inner passage, a concentric outer passage, a cylindrical body having a locking mechanism, a face sleeve, received within and axially moveable relative to the cylindrical body, engageable with the cylindrical plug when the male half is inserted into the female half. The female half also includes a cylindrical sealing sleeve received within and axially moveable relative to the face sleeve, engageable with the cylindrical outer sleeve when the male half is inserted into the female half. The female half further includes a cylindrical valve body, positioned within and axially moveable relative to the cylindrical sealing sleeve from a first position in which the outer surface of the cylindrical valve body is sealed against the inner surface of the cylindrical sealing sleeve to a second position in which the outer surface of the cylindrical valve body is free of being sealed against the inner surface of the sealing sleeve, engageable with the valve body when the male half is inserted into the female half. The female half also includes an inner valve, positioned within and axially moveable relative to the cylindrical valve body, having a forward end, with a front face engageable with the valve element when the male half is inserted into the female half, and a plurality of side passages. The inner valve is moveable from a first position, in which the outer surface of the forward end is sealed against the inner surface of the valve body, to a second position, in which the outer surface of the forward end is out of contact with the valve body (86). In the first position, the male half inner passage and the male half concentric outer passage are each isolated from all other passages, and the female inner passage is fluidly connected with the female half concentric outer passage. In a position between the first and second positions, the female half inner passage and at least one of the male half inner passage and male half concentric outer passage are fluidly connected with the female half concentric outer passage. In the second position, the female half inner passage is fluidly connected with the male half inner passage, and the female half concentric outer passage is fluidly connected with the male half concentric outer passage.

Still another feature of the noted quick disconnect coupler includes having the female half inner passage as a high pressure passage, the female half concentric outer passage is a low pressure passage, the male half inner passage is a high pressure passage, and the male half concentric outer passage is a low pressure passage. Still another feature of the noted quick disconnect coupler has the male half inner valve element being substantially cup-shaped and having a continuous, uninterrupted outer surface. A further feature of the noted quick disconnect coupler has the male valve body attached to the male cylindrical body via press-fitting, the female cylindrical sealing sleeve attached to the cylindrical body via press-fitting, and the female inner valve attached to the cylindrical sealing sleeve via press-fitting.

Still another feature of the present invention has the noted quick disconnect coupler being part of a quick disconnect assembly and attached with a series of hose assemblies. The female half is attached to a first high pressure hose assembly, including a first hose fitting having a first end sealingly attachable to the female inner valve, a longitudinal passage extending therethrough which is axially aligned with the inner valve inner passage when the first hose fitting is attached to the female coupler half, and a second end. The first high pressure hose assembly also includes a first conduit having a first end sealingly attachable to the second end of the first hose fitting and a second end. The female coupler half is also attached to a first low pressure hose assembly that includes a second hose fitting having a first end sealingly attachable to the cylindrical body, a longitudinal passage extending therethrough which is axially aligned with the female half outer passage when the second hose fitting is attached to the female half and a second end. The first low pressure hose assembly also includes a second conduit having a first end sealingly attachable to the second end of the second hose fitting and a second end. The male coupler half is attached to a second high pressure hose assembly that includes a third hose fitting having a first end sealingly attachable to the male inner valve body, a longitudinal passage extending therethrough and axially aligned with inner passage when the third hose fitting is attached to the male half and a second end. The second high pressure hose assembly also includes a third conduit having a first end, sealingly attachable to the second end of the third hose fitting and a second end. The male coupler half is also attached to a second low pressure hose assembly that includes a fourth hose fitting having a first end sealingly attachable to the male cylindrical plug, a longitudinal passage extending therethrough that is aligned with passage when the fourth hose fitting is attached to the male half and a second end. The second low pressure hose assembly also includes a fourth conduit having a first end sealingly attachable to the second end of the fourth hose fitting and a second end.

Still another feature of the noted quick disconnect assembly has the first, second, third and fourth fittings being capable of repeated assembly and disassembly relative to respective ones of the female and male halves. Yet another feature of the noted quick disconnect assembly has the third hose fitting attached to the male inner valve body via a press-fit arrangement. Further features and advantages of the present invention will become apparent to those skilled in the art upon review of the following specification in conjunction with the accompanying drawings.

BRIEF DESCRIPTION OF THE DRAWINGS

FIG. 3 is a partial sectional view of the female half of the coaxial coupling with an unattached high pressure hose assembly.

FIG. 4 is a partial sectional view of both the female and male halves of the coaxial coupling with an unattached low pressure hose assembly.

FIGS. 11-14 are longitudinal sectional views of half of the male and female couplings, similar to FIG. 10, showing the male coupling at respective incremental connection stages with the female coupling.

DETAILED DESCRIPTION OF THE PREFERRED EMBODIMENTS

Figure 1:
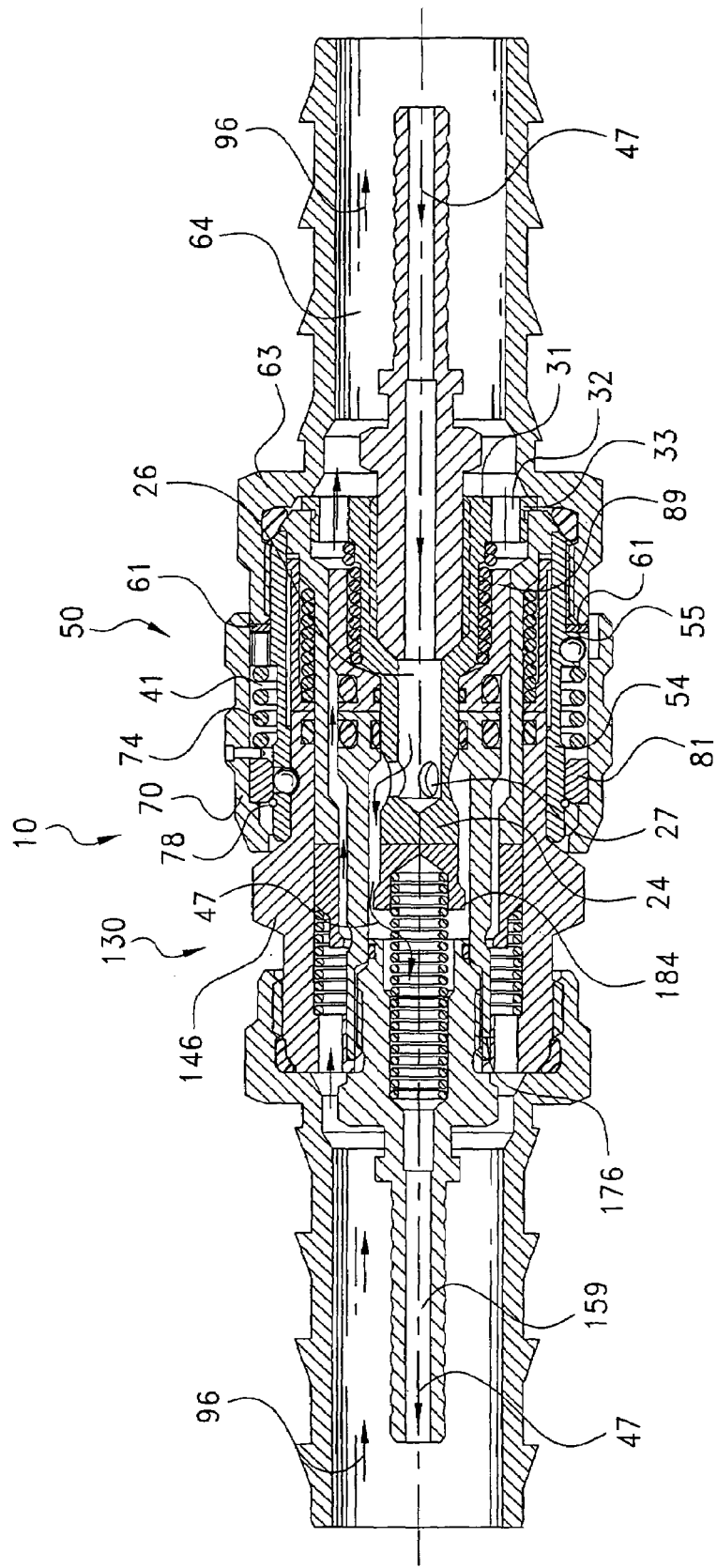
FIG. 1 is a longitudinal sectional view of a first embodiment of a connected coaxial coupling, with attached end fittings, according to the present invention.

Referring to FIG. 1, the present invention relates to a first embodiment 10 of a coaxial coupling that is utilized for quickly connecting and disconnecting coaxial hoses or twin line hose assemblies. Coaxial coupling 10, when connected with hose assemblies, can be particularly useful for connecting a piece of construction or industrial equipment (e.g. pump) to a remote implement (e.g. a piece of rescue equipment), however, it should be appreciated that such couplings could be used for a variety of applications that require quick connection and disconnection. Coaxial coupling 10 enables the system to have just one coupling and one coaxial hose instead of two separate hoses and couplings. The present invention is more compact, lightweight and easier for an end user to connect and use. Other applications include any system that utilizes two hoses which can be combined into one hose for the noted reasons.

Figure 2:
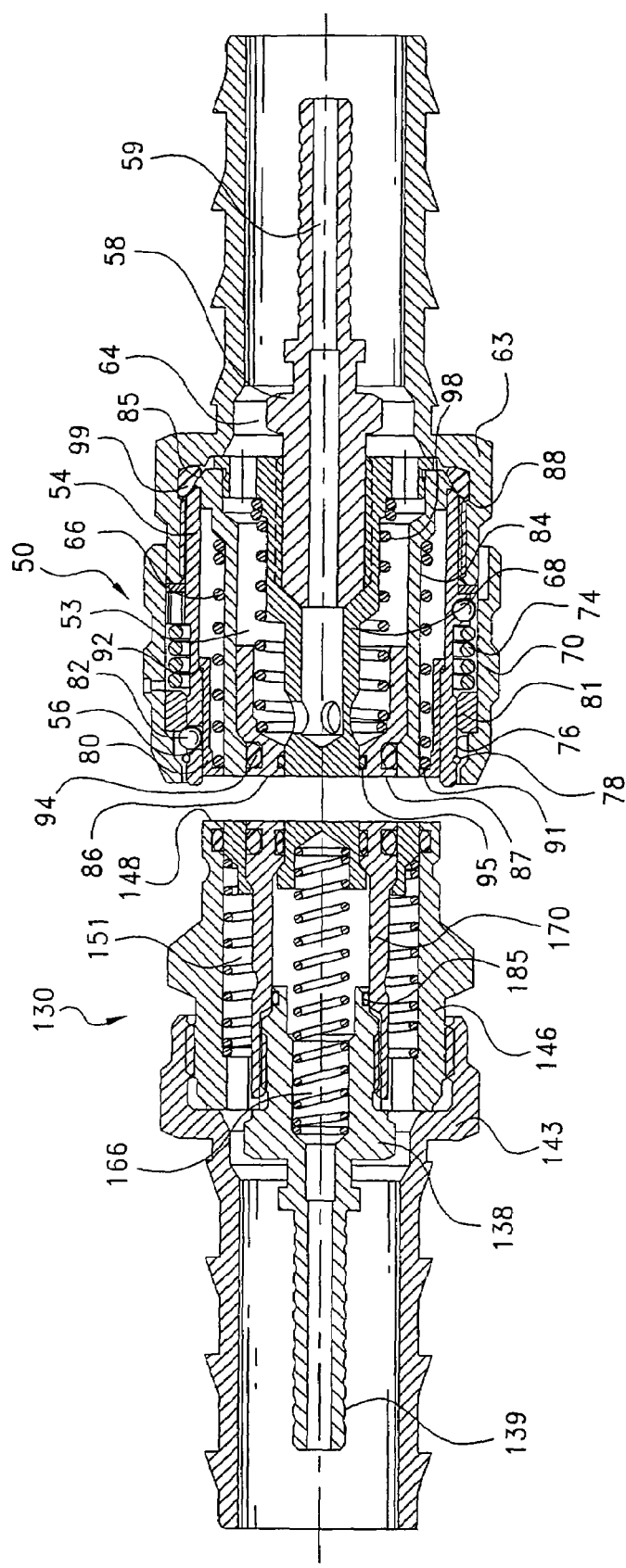
FIG. 2 is a longitudinal sectional view of the coaxial coupling shown in FIG. 1, with separated male and female halves.

Referring to FIGS. 1, 2 and 4, coaxial coupling 10 is comprised of a male half 130 and a female half 50. FIG. 4 shows male 130 and female 50 halves prior to attachment with respective end fittings. FIG. 2 shows male 130 and female halves 50 uncoupled, but united with respective end fittings. Specifically, male coupling 130 is attached to both a first high pressure hose fitting 138 and a first low pressure hose fitting 143, coaxial with each other. Female coupling 50 is attached to both a second high pressure hose fitting 58 and a second low pressure hose fitting 63, again coaxial with each other. As shown in FIG. 1, the inner flow passage (indicated by flow arrow 47) through coupling 10 and high pressure hose fittings 138, 58 serves as the high pressure fluid supply line. The coaxial outer flow passage (indicated by flow arrow 96) through coupling 10 and low pressure hose fittings 143, 63 serves as the low pressure fluid return line.

Referring to FIG. 2, female half 50 includes a cylindrical body 54 which is fixedly connected to second low pressure hose fitting 63. Fitting 63 can have any desired outer geometry (e.g. hexagonal configuration) appropriate for being engaged by a conventional tool, and an inner geometry defining an internal cavity or passage 64 having a first end that is fluidly connected with an internal low pressure coupler passage 53 within female half 50. The second end of passage 64 is likewise fluidly connected with a passage 93 (shown in FIG. 5) within a low pressure conduit 90, or otherwise can be connected, as appropriate, within the fluid system. Body 54 has a front end with a plurality of circular openings 56, evenly spaced around its circumference, for receiving a plurality of locking balls 82. Body 54 also has a rear end that attaches (e.g. threadingly) with the front end of second low pressure hose fitting 63.

A cylindrical locking collar 70 is received on the front end of body 54 and peripherally envelopes a portion thereof. Locking collar 70 includes a known, outer, knurled surface 72 (shown in FIG. 4) for easy grip by the user. A spring 74 is located internally of collar 70 (housed within a cavity located between the outer surface of body 54 and inner surface of collar 70) for urging locking collar 70 forwardly along body 54. Locking collar 70 further includes an inner circumferential groove or channel 56 which is dimensioned to receive locking balls 82 in order to retain locking collar 70 on body 54 when coupling 10 is disconnected (as shown in FIG. 2). A retaining ring 78 is provided forwardly of channel 56 to retain locking collar 70 in the position shown in FIG. 2. If locking ball 82 is dislodged from its abutment with a locking sleeve 81, retaining ring 78 will prevent locking sleeve 81 (and collar 70) from moving forwardly. Locking sleeve 81 is securely situated inside locking collar 70 since its outer frontal edge contacts an inner shoulder of locking collar 70 and its outer rear edge contacts spring 74. Locking collar 70 thereby has limited axial movement along body 54. As best seen in FIG. 1, a washer seal 61 is located inside the rearward end of locking collar 70 and abuts the forward annular end of second low pressure hose fitting 63. Washer seal 61 is shaped to match the inner surface contour of locking collar 70, and is free to rotate with same.

Female coupling half 50 includes two valve assemblies. A first valve assembly 68 is affiliated with high pressure hose fitting 58 and will be discussed below. A second valve assembly includes an axially-moveable and spring-biased cylindrical face sleeve 80; a coaxial cylindrical sealing sleeve 84 received within face sleeve 80; and a cylindrical valve body 86 located within sealing sleeve 84. Cylindrical face sleeve 80 is axially moveable relative to cylindrical body 54 and is unidirectionally biased by a spring 66. Cylindrical sealing sleeve 84 has a rear, outwardly extending annular shoulder 85 which is fixed in a groove 88 formed at the intersection of low pressure hose fitting 63 and cylindrical body 54. An O-ring 99, located within groove 88, is compressively sealed by annular shoulder 85 and hose fitting 63. Annular shoulder 85 is press-fitted into sealing relationship with cylindrical body 54 at a location indicated by element 75, best shown in FIG. 16. O-ring 99 prevents fluid traveling along a flow passage (represented by arrow 96) from egressing outwardly. Outer flow passage 96 is located between sealing sleeve 84 and cylindrical valve body 86 and continues on, through coupling 10, when male 130 and female 50 halves are connected (as shown in FIG. 1).

Cylindrical face sleeve 80 is dimensioned so as to be closely received within cylindrical body 54 and moves axially with respect thereto. Face sleeve 80 includes an annular, radially-inwardly directed annular flange 91 at its front end, and a radially-outwardly directed annular flange 92 at its rear end. Rear flange 92 is designed to engage a radially-inwardly projecting annular shoulder on cylindrical body 54 to limit the forward movement of face sleeve 80 with respect to body 54. Spring 66 urges face sleeve 80 forwardly on body 54 and is disposed between the inner surface of annular flange 91 and an outer surface of annular shoulder 85 of sealing sleeve 84.

Valve body 86 is axially moveable within cylindrical sealing sleeve 84 and is biased forwardly by a spring 98. Valve body 86 includes an enlarged forward valve head 87 with a flat front face and a rearward portion 89 having longitudinal channels for allowing fluid flow. Valve head 87 has an inner surface with a groove that houses an inner O-ring 95 and an outer surface with a groove that house an outer O-ring 94. Inner O-ring 95 provides a fluid tight seal between cylindrical valve body 86 and a female high pressure inner valve 68. Outer O-ring 94 provides a fluid tight seal between cylindrical valve body 86 and an inwardly extending front shoulder of cylindrical sealing sleeve 84.

Female high pressure inner valve 68 includes a forward end 24 with a flat front face and an outer surface that sealingly abuts the inner surface of valve head 87, via inner O-ring 95, when female half is in the uncoupled position shown in FIG. 2. An entire outer circumferential portion of forward end 24 contacts seal 95 ensuring that fluid inside passage 53 doesn't extend beyond this junction. Inner valve 68 has an inner passage 26 that is in fluid communication and coaxial with an inner passage 59 inside second high pressure hose fitting 58 when same is physically attached to high pressure inner valve 68. High pressure inner valve 68 has a series of lateral radial passages 27 near forward end 24 that fluidly connect valve inner passage 26 with coupler passage 53 when female half 50 is in the uncoupled position, or is separated from male half 130, as shown in FIG. 2. Referring to FIGS. 1 and 2, high pressure inner valve 68 has a rearward end flange 31 having longitudinal passages 32 that fluidly connect coupler passage 53 with low pressure hose fitting passage 64. Rearward end flange 31 further has a radial extension 33 that is fixedly attached, e.g.—in a press-fit manner, with outwardly extending sealing sleeve annular shoulder 85 at a location indicated by element 71, best seen in FIG. 16.

Figure 10:
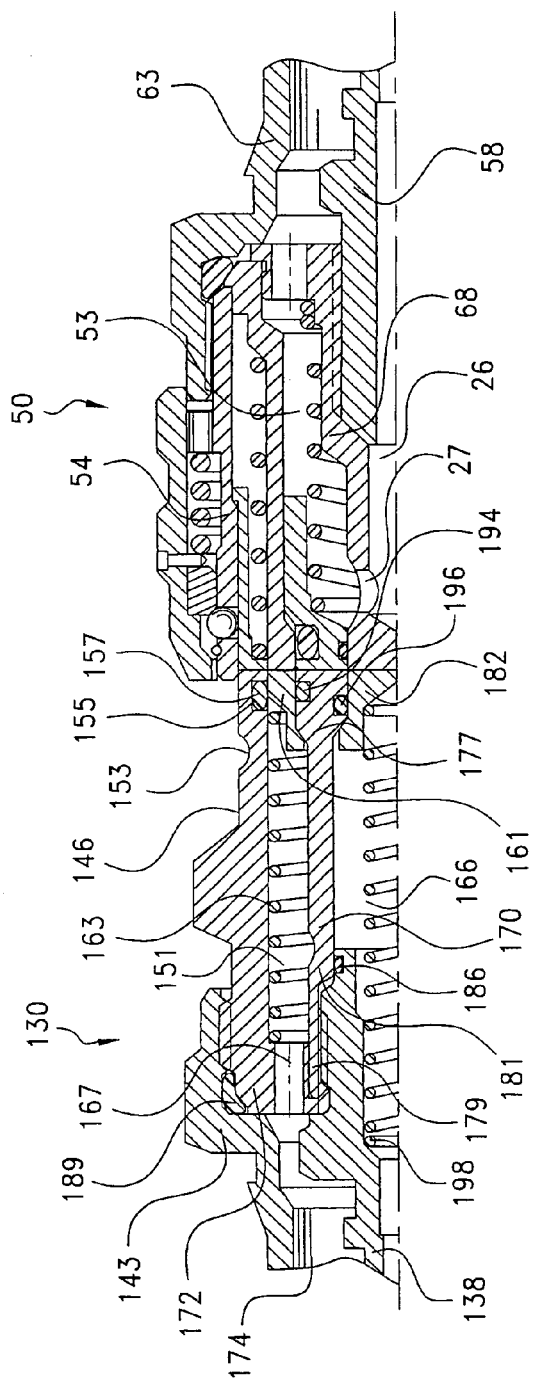
FIG. 10 is a longitudinal sectional view of the first embodiment half of the male and female couplings, with attached end fittings, shown at an initial stage of connection.

Referring to FIGS. 1, 2, and 10, male coupling half 130 includes a generally cylindrical plug 146 defining an inner fluid passage 151. Plug 146 has a flat annular front surface 148, which, when coupled, as illustrated in FIGS. 2 and 10, can be located flush against face sleeve inwardly-directed flange 91 of female half 50 and can be received within female cylindrical body 54. Plug 146 further includes a circumferential locking groove 153 in its outer surface and an inwardly facing groove 155 in its inner surface. A seal, or O-ring 157 is housed within groove 155 and prevents fluid within inner fluid passage 151 from escaping between plug 146 and an outer sealing sleeve 161 received on the inner peripheral surface of plug 146. The other end of plug 146 is fixedly interconnected, such as via cooperating threads, to an adjoining end of low pressure fitting 143. A seal, or O-ring 189 is positioned between plug 146 and low pressure fitting 143 to prevent any fluid, within an internal passage 174 of low pressure hose fitting 143, from escaping. A plurality of longitudinal flow passages 167 are integrated within a rear section 172 of cylindrical plug 146 in order to fluidly connect low pressure hose fitting internal passage 174 with inner fluid passage 151 of cylindrical plug 146. A spring 163 is positioned within passage 151 and biases outer sleeve 161 towards the front end of male half 130. Specifically, spring 163 is disposed between an inner shoulder of cylindrical plug 146 and an outer shoulder of outer sealing sleeve 161. Outer sealing sleeve 161 is movable relative to cylindrical plug 146 and has a front face which abuts the annular frontal face of female cylindrical sealing sleeve 84 when coupled (as in FIG. 1).

An inner valve cylindrical body 170 is interposed between cylindrical plug 146 and outer sealing sleeve 161. Inner valve body 170 has a front portion or head 177 that has a flat frontal annular surface that abuts the front face of female valve head 87 when coupled (as shown in FIG. 1). Head 177 has an outer peripheral surface with a groove that houses a seal or O-ring 194 and an inner peripheral surface with a groove that houses another seal or O-ring 196. In the closed or uncoupled position shown in FIG. 2, O-ring 194 prevents fluid within fluid passage 151 from escaping between outer sleeve 161 and valve body 170, and O-ring 196 prevents fluid within an inner passage 166 from escaping between valve body 170 and an inner valve sealing element 182. Inner valve body 170 has a tail portion 179 with an inner surface which is interconnected, e.g., by press-fitting or via threads, to cylindrical plug 146 at a position indicated by element number 176, best seen in FIG. 16. When tail portion 179 is interconnected with a plug rear section 172 (e.g., at press-fit location 176), all previous clearances between valve body tail portion 179 and plug rear section 172 are totally eliminated. Between head 177 and tail portion 179, inner valve body 170 has an inner annular shoulder 181 that has a smaller inner diameter than that of tail portion 179.

Inner valve sealing element 182 has a flat frontal face that abuts the face of female high pressure inner valve forward end 24 when male half 130 is coupled with female half 50 (as in FIG. 1). A spring 198 biases valve element 182 forward such that a rear outer annular shoulder 184 thereof contacts an outer shoulder of valve body head 177. Specifically, spring 198 is disposed between the inner surface portion of valve element 182 and the inner stepped surface portion of high pressure hose fitting 138. Hose fitting 138 is preferably affixed to inner valve body 170 with threads at tail portion 179. The leading portion of fitting 138 has an O-ring seal 186, housed within a groove 185, which is press-fitted against the inner surface of inner valve body 170 near valve body inner shoulder 181 to eliminate any clearance between fitting 138 and valve body 170. This press-fit connection is indicated by element number 192, best shown in FIG. 16. This allows extremely high pressurized fluid, within passage 166, to be sealed with only a standard seal, such as O-ring 186, when flowing through male coupler 130 towards a high pressure passage 159 within fitting 138 and eliminates the necessity for a backup washer in groove 185 as well as forming a reliable seal at high pressure operating conditions.

FIGS. 3-7 illustrate the sequence for connecting coaxial hoses 65 and 90 to male 130 and female 50 coaxial coupling halves. It should be noted that FIGS. 3-7 show one coaxial hose assembly being coupled with both an unattached female coupler 50 and an unattached male coupler 130. It is common for only one end of the hose assembly to be connected to one of the male 130 and female 50 halves of coaxial coupling 10 with the other one of the male and female halves being attached to something other than coupling 10, e.g. a tool. FIGS. 3-7 show but one hose assembly for sake of simplicity. As is well known in the art, the inner hose assembly conducts higher pressure fluid than the outer hose assembly.

It should also be noted that both male 130 and female 50 halves are fully contained sub-assemblies without hose fittings 138, 143, 58, 63 being installed thereon. This simplifies the assembly procedure for an installer. High pressure end fittings 138 and 58 can separately be attached to a conduit 65 (as will be explained below), forming a high pressure hose assembly, and that assembly can simply be attached to coupling halves 130 and 50. Likewise, low pressure end fittings 143 and 63 can be attached to a conduit 90, forming a low pressure hose assembly, and that low pressure hose assembly can also be attached to coupling halves 130 and 50. It is common in the industry for an installer to have a prefabricated hose assembly that needs to be attached to either of the coupler halves (which are typically attached to, e.g., the portable tool implement or the piece of industrial equipment). Since male and female halves 130, 50 are fully contained subassemblies, end fittings 138, 143, 58 and 63 can be installed in the field. Without the self-contained subassembly, the hose end fittings would have to be integrated into the male and female coupling halves. Upon assembly with the hose assemblies, both male and female halves 130, 50 have internal components that have been press-fitted so that leak paths are minimized.

Figure 16:
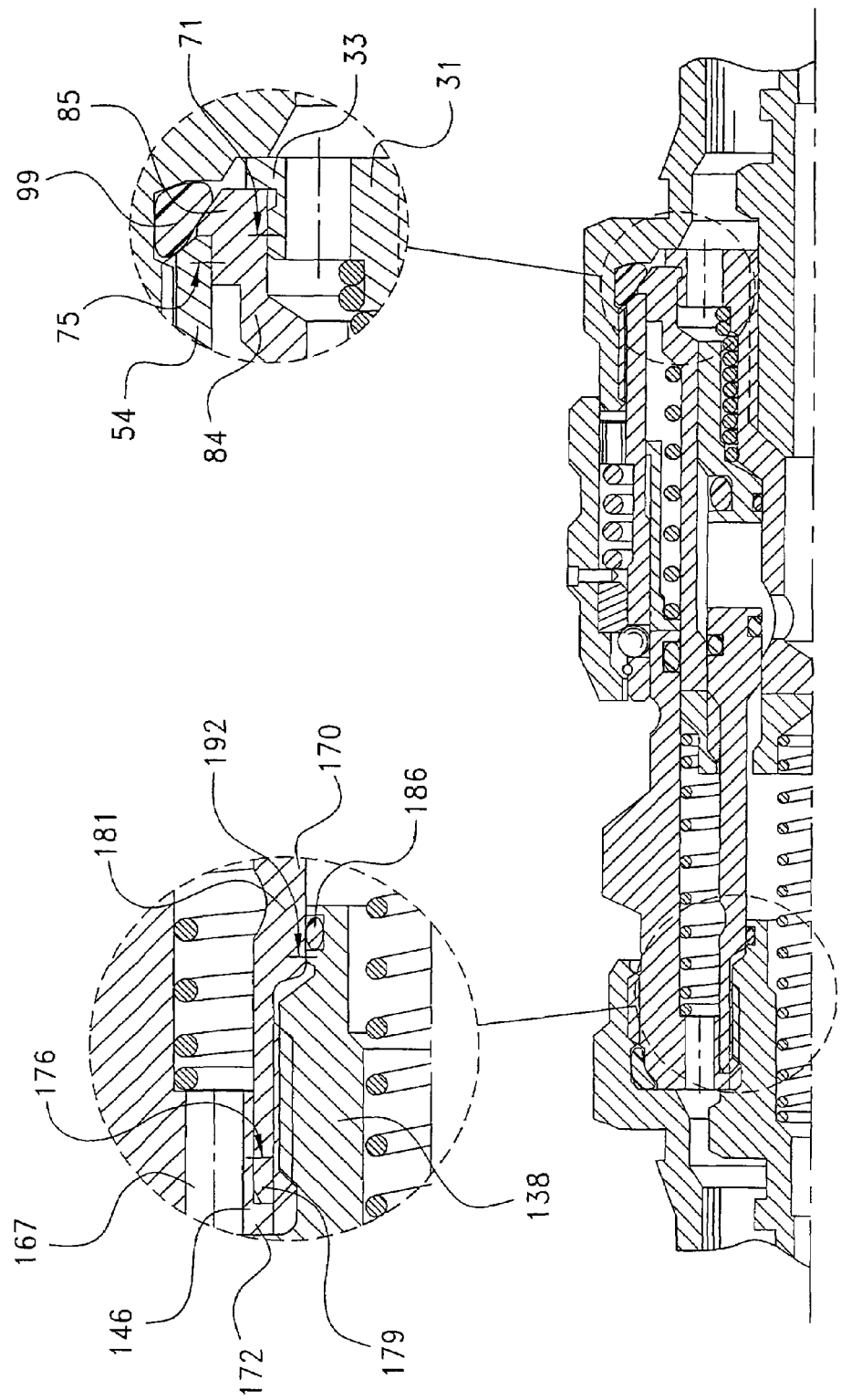
FIG. 16 is a longitudinal sectional view of half of male and female couplings, with enlarged sections detailing the connection of components.

Referring to FIG. 16, male half 130 has press-fitted components, namely the abutting relationship of valve body inner shoulder 181 and the leading portion of fitting 138, specifically O-ring 186, at location 192. Inner shoulder 181 of male half inner valve body 170 is press-fit with plug rear section 172 at location 176. Female half 50 has press-fitted components, namely the abutting relationship of inner valve rearward end 31 and cylindrical sealing sleeve 84, at location 71, and the abutting relationship of cylindrical body 54 with sealing sleeve annular shoulder 85 at location 75. As is well known in the art, press-fitting (also known as compression-fitting and interference-fitting) is just one method of producing the sub-assembly. Other methods such as threading could be used. Press-fitting does provide a reliable sealing connection without the need for extra sealing elements. In high pressure applications this is useful since sealing elements, e.g. washers, may be extruded by the high pressure thus providing an unwanted leakpath. Press-fit metal components will not be adversely affected by these high pressures. Press-fitting also ensures that the eccentricity of male and female halves, 130, 50, remains at a minimum (preferably zero). This is important in this application since the coaxial passages have to be aligned in order to ensure leak free fluid communication between the same. If both halves 130, 50 do not remain concentric, they will not properly mate and high pressurized fluid will easily escape.

Figure 5:
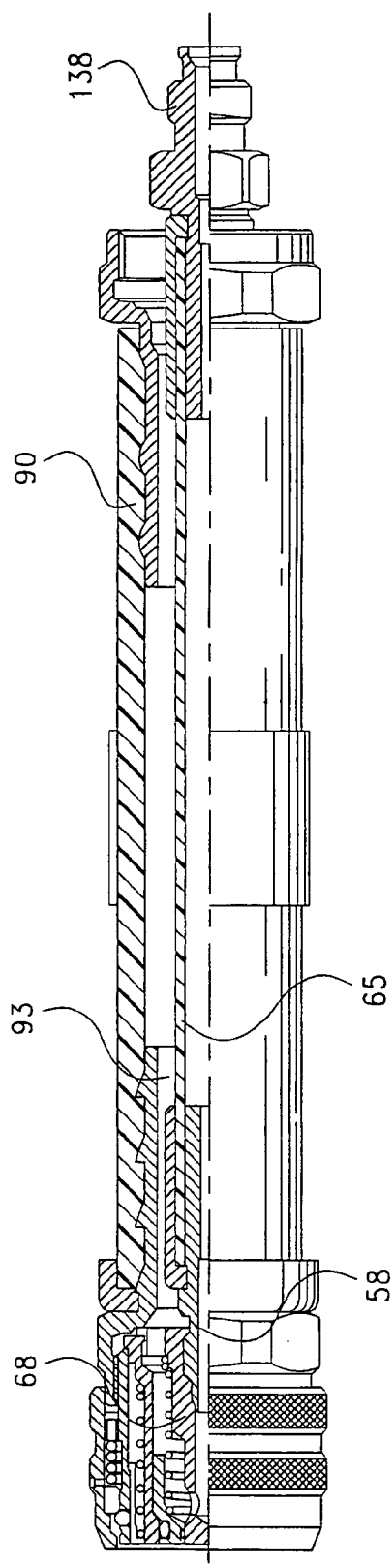
FIG. 5 is a partial sectional view of the female half of the coaxial coupling with attached high and low pressure hose assemblies.
Figure 6:
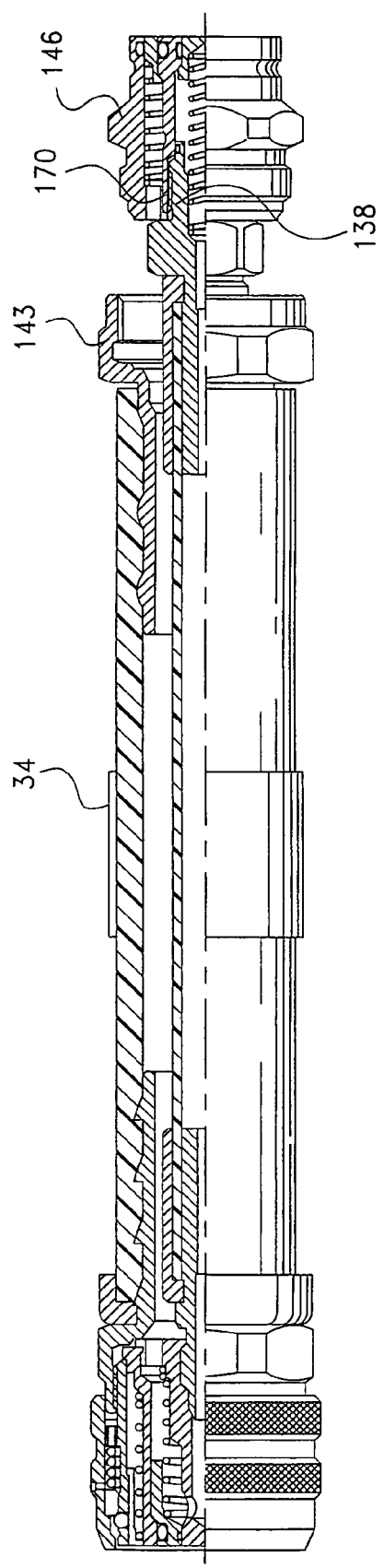
FIG. 6 is a partial sectional view similar to FIG. 5, but also showing the male half of the coaxial coupling attached with the high pressure hose assembly.
Figure 7:
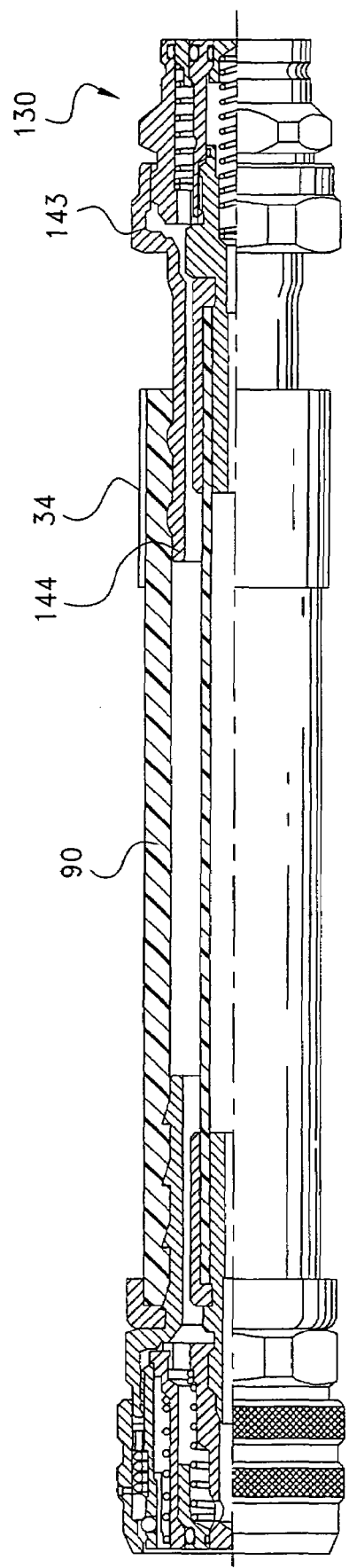
FIG. 7 is a partial sectional view of both the male and female halves of the coaxial coupling fully attached to the high and low pressure hose assemblies.

Referring to FIG. 5, second high pressure hose fitting 58, which is attached to a high pressure conduit 65, is threaded into female coupling half high pressure inner valve 68. Low pressure conduit 90 along with attached second low pressure fitting 63 is slid over high pressure conduit 65 while fitting 63 is threaded to female coupling half cylindrical body 54. Referring to FIG. 6, male coupling half inner valve body 170 is threaded to first high pressure hose fitting 138. Referring to FIG. 7, then first low pressure hose fitting 143 is moved towards male coupling half 130 and is threaded onto cylindrical plug 146. A metal sleeve 34, positioned around the outside of low pressure conduit 90 is moved to the right and secures conduit 90 around a nipple portion 144 of low pressure hose fitting 143.

FIGS. 10-15 illustrate the connection or coupling of male half 130 with female half 50. Referring to FIG. 10, male half 130 (left half) and female half 50 (right half) are shown aligned and having their flat annular frontal faces abutting prior to connection. The interior of female cylindrical body 54 receives male half 130, specifically cylindrical plug 146 thereof, and functions as a pilot for insertion of the latter. As noted above, passage 151 conducts low pressure fluid within male coupler half 130; passage 166 conducts high pressure fluid within male coupler half 130; passage 53 conducts low pressure fluid within female coupler half 50; and passage 26 conducts high pressure fluid within female coupler half 50. As shown in FIG. 10, passages 26 and 53 are connected via side passages 27 in inner valve 68. This interconnection of coaxial paths within female coupler half 50 prevents any pressure build-up therein since any high pressure fluid within passage 26 travels directly to passage 53. Although described in greater detail below and shown in FIG. 1, it should be noted that high pressure fluid (referenced by flow arrow 47) is supplied (e.g. by an external pump) within passage 26 and low pressure fluid (referenced by flow arrow 96) is returned through passage 64 which is connected to the hydraulic fluid reservoir and is at atmospheric pressure. Likewise, within male coupler half 130, high pressure fluid is conducted within passage 166 and low pressure fluid is conducted within passage 151.

Figure 11:
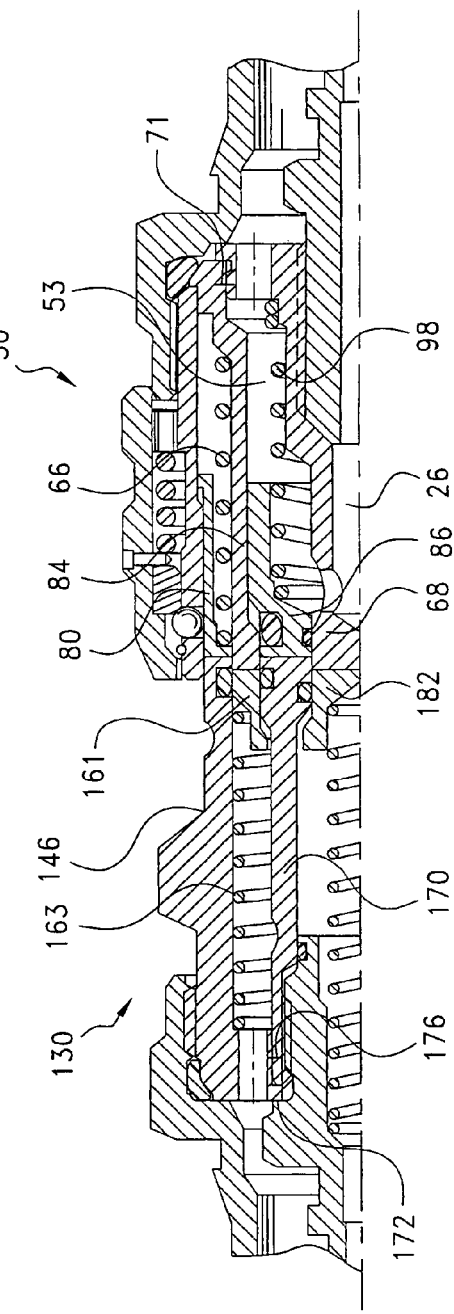

FIGS. 11-12 show the two halves 50, 130 in successive progressing stages of connecting. The flat annular frontal surface of cylindrical plug 146 engages flush with abutting face of face sleeve 80 and moves face sleeve 80 rearwardly in female half 50. At the same time, cylindrical sealing sleeve 84 of female half 50 engages male half outer sealing sleeve 161 and drives same rearward against the force of spring 163. Outer sleeve 161 is thus moved off seals 157, 194, and the outer surface of cylindrical sealing sleeve 84 begins to abut seals 157, 194. Further, the front face of inner valve body 170 abuttingly moves cylindrical valve body 86 rearwardly against the force of spring 98. Seal 94 remains in contact with the inner surface of cylindrical sealing sleeve 84. O-ring 95 remains in contact with the outer surface of high pressure inner valve 68. O-ring 196 remains in contact with valve element 182. The flat front face of high pressure inner valve 68 abuttingly contacts the flat front face of valve element 182 and pushes same rearward against the force of spring 198. It should be noted that during this movement, inner passage 26 continues to be fluidly connected with outer passage 53 via lateral side passages 27.

Referring to FIG. 13, cylindrical plug 146 and inner valve body 170 have moved face sleeve 80 and cylindrical valve body 86 further into female half 50. Similarly, cylindrical sealing sleeve 84 and high pressure inner valve 68 have pushed outer sealing sleeve 161 and valve element 182 further into male half 130. Seal 157 is still in contact with the outer surface of cylindrical sealing sleeve 84. Seals 94 and 194 have moved out of contact with sealing sleeve 84. Seal 95 has moved out of contact with inner valve 68 at passages 27 but seal 196 remains in contact with the surface of inner valve 68. Thus, inner passage 26 is still partially open to passage 53 while inner fluid passage 151 just begins opening to passages 26 and 53. Therefore both passages 26 and 151 can dump their pressurized fluid into passage 53, which leads to the reservoir (and is under atmospheric pressure) before inner high pressure passage 166 opens. This prevents any trapped pressurized fluid within passage 166 from entering low pressure passage 53 and results from the positioning of seals 196 and 194. Since seal 194 is positioned more forward on valve body head 177 it discontinues its sealing relationship with cylindrical sealing sleeve 84 before seal 196 moves off the front portion of inner valve 68.

Figure 17:
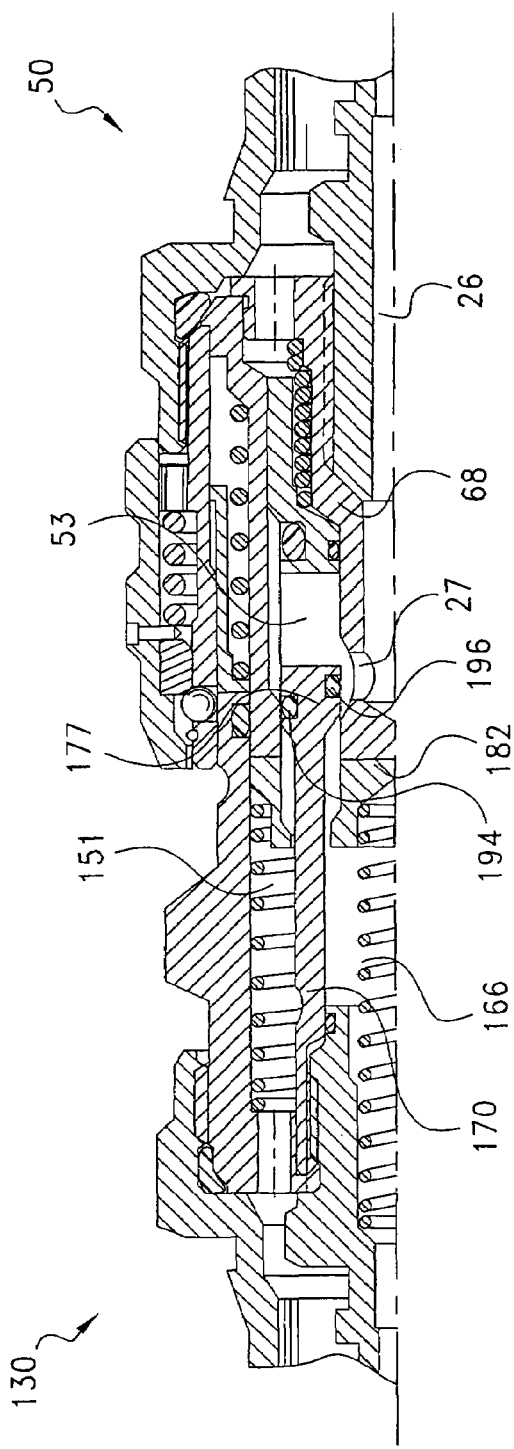
FIGS. 17 and 18 are longitudinal sectional views of half of the male and female couplings, similar to FIG. 14, showing alternative placements of seals within the male coupling.
Figure 18:
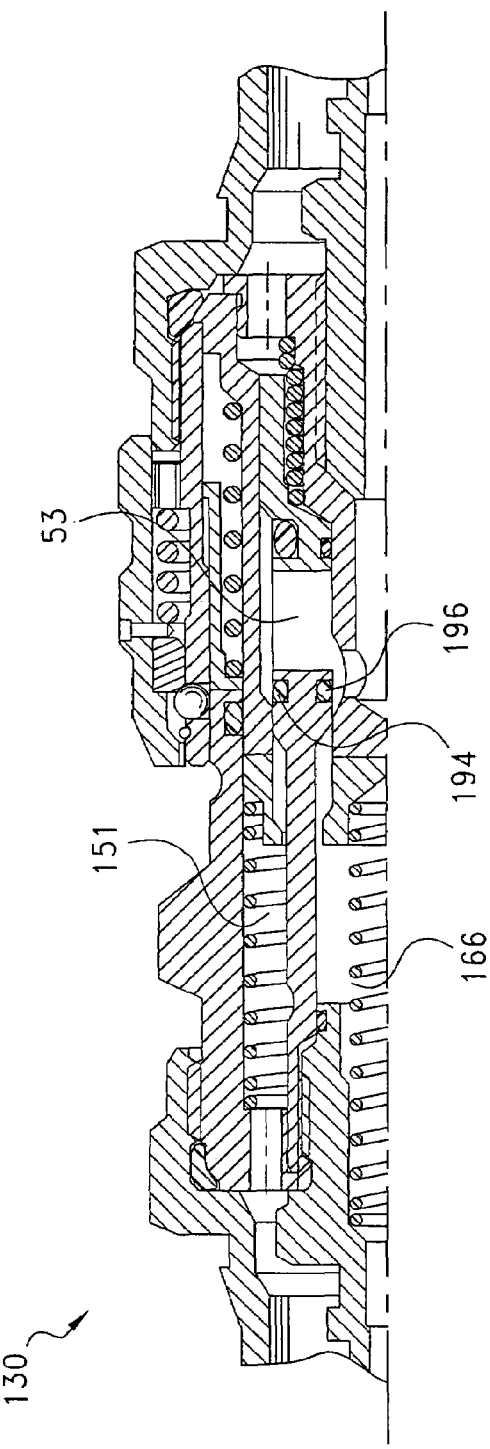

Alternatively and shown in FIG. 18, seals 194 and 196 can be axially aligned so that both passages 151, 166 dump fluid to passage 53 simultaneously. This will ensure that any trapped pressurized fluid within male half 130 is routed through passage 53 to the reservoir. This assists with pressure relief in systems where either the inner or outer fluid passage conducts high pressurized fluid. Still alternatively and shown in FIG. 17, seal 196 can be positioned more forwardly on valve body head 177 than seal 194. In this position, as inner valve body 170 travels forwardly, relative to female coupling half 50, seal 196 is no longer in sealing abutment with either male coupler inner valve element 182 or female coupler high pressure inner valve 68. Rather, seal 196 is in axial alignment with inner valve side passages 27, thus allowing pressurized fluid to escape from passage 166 and travel to the path of lowest pressure resistance, which is passage 53. This opens high pressure passage 166 to passage 53 before opening low pressure passage 151 to passage 53. Once seal 196 of inner valve body 170 travels past side passages 27, it sealingly abuts the outer surface of inner valve 68 and closes passage 166 to passage 53, and only allows fluid communication between passage 166 and passage 26.

Figure 14:
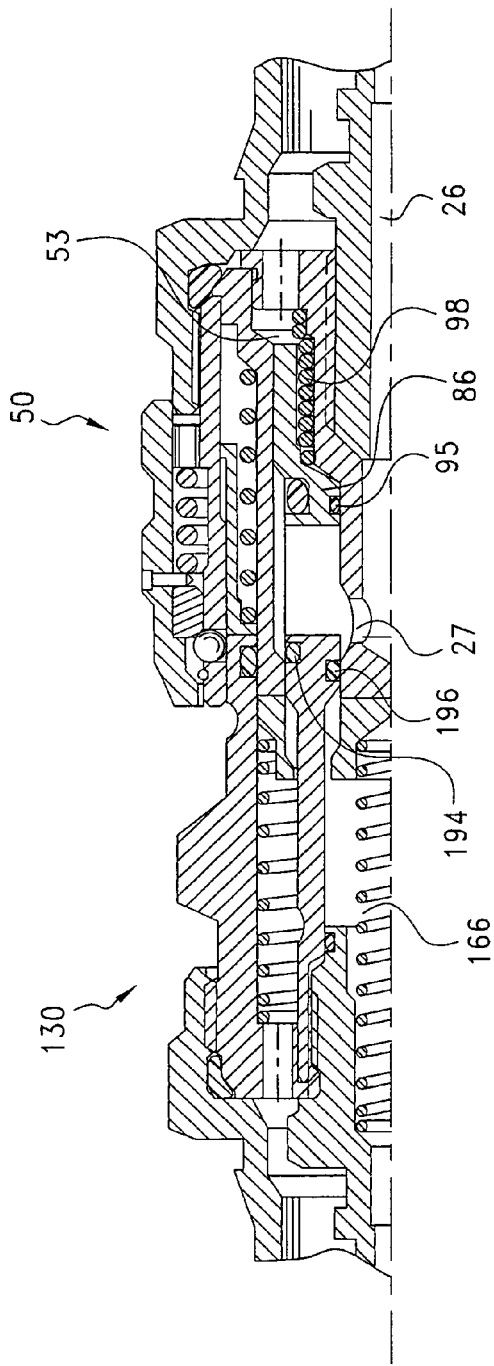

Referring to FIG. 14, passage 26 is now the flow path that receives pressurized fluid from an external component, e.g. a pump. The external component can be supplying pressurized fluid while female coupler 50 is closed off from male coupler 130. The pressurized fluid will flow from passage 26 to passage 53. Between FIGS. 13 and 14, cylindrical valve body 86, and specifically seal 95, passes over side passages 27 which are receiving pressurized fluid from inner passage 26. The fluid flow chokes off and pushes valve body 86 back against the pressure of spring 98. This ensures that passage 53 remains open to pressurized passage 26 and allows full flow during the balance of the connect cycle. Seal 196 remains in contact with the outer surface of inner valve 68 on the front side of passages 27 so fluid flow from passage 26 cannot enter inner passage 166 of male half 130.

Figure 15:
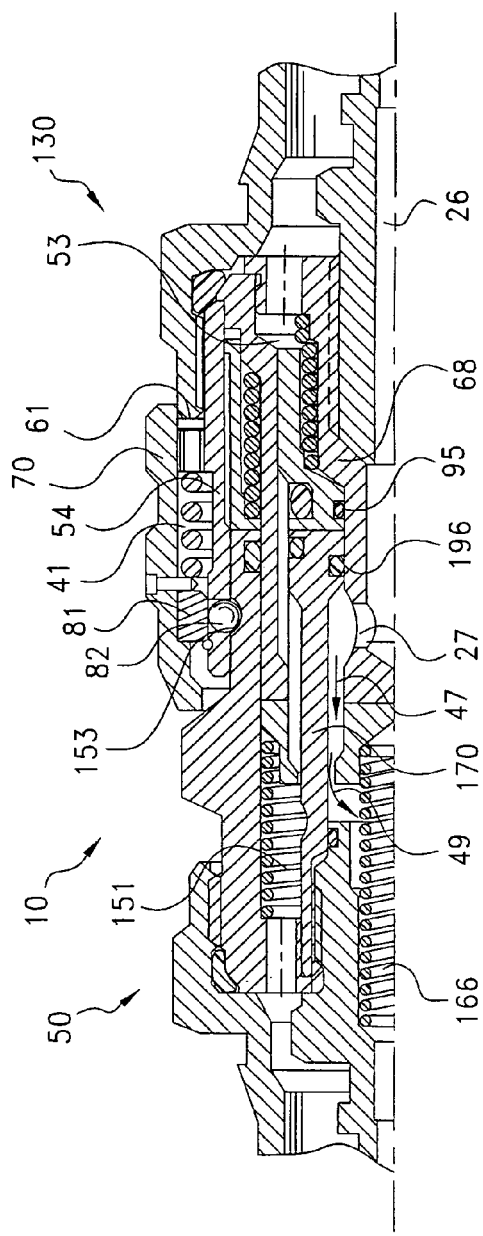
FIG. 15 is a longitudinal sectional view of half of the male and female couplings, similar to FIG. 14, shown with the male coupling half fully connected with the female half.

FIG. 15 shows coupling 10 fully connected. Locking balls 82 have dropped into locked position within locking groove 153 in the male half 130. Locking collar 70 has moved to the left, positioning locking sleeve 81 over locking balls 82 which are securely seated within groove 153. Seal 196 passes over radial side passages 27 and abuts the outer surface of inner valve 68 on the rear side of passages 27 so flow from passage 26 can no longer directly enter passage 53. Flow passages 26 and 166 are now connected via passages 27. Flow passages 53 and 151 are connected.

Referring to FIGS. 1 and 10-15, the fluid flow through male half 130, female half 50, and connected coupling 10 will be detailed. FIG. 1 illustrates two flow paths 47, 96 through connected coaxial coupling 10. High pressure fluid from the pump (not shown) flows from right to left (indicated by arrows 47), through the coupling and to the hydraulic tool (not shown). Return, low pressure fluid flows from the tool, to the right (indicated by arrows 96), and to the hydraulic reservoir. Referring to FIG. 10, flow from the pump passes through fitting 58, through coupler inner valve 68, through side passages 27, through passage 53; and out coupler 63 back to the reservoir. Fluid within passages 166 and 151 are isolated from other passages. This flow pattern continues until FIG. 13 wherein fluid within passage 151 can start to enter passage 53. This is the first time that fluid from male half 130 communicates with fluid from female half 50. At this time of the coupling sequence, all fluid flow is traveling to the reservoir (not shown) which is the location of least pressure.

FIG. 14 shows how pressurized fluid can still continue to flow within female coupler 50 while male half 130 is being coupled with female half 50, even as the pump is supplying pressurized fluid to passage 26. The pressurized fluid can continue to flow back to the reservoir (through passage 53) during the coupling sequence. This enables a connection of male and female halves, 130, 50, when the pump is operating while ensuring that the pressure within female coupler 50 does not suddenly spike from impeded flow. If the fluid flowing through passage 26 is impeded or stopped, the pressure within passage 26 will increase which can provide an obstacle during assembly. In FIG. 15, full high pressure flow is achieved through inner passages 26 and 166. Full low pressure fluid flow is seen in passage 151 and 53. The high pressure flow path at the connection of inner valve 68 and valve element 182 is "around" the outer peripheral surface of valve element 182 and not "through" the valve, e.g. via radial apertures. Flow around valve element 182 creates less restriction and less pressure drop compared with the fluid flow if it passes directly through same.

Referring again to FIG. 1, during the connection and disconnection of coupling halves 130, 50, locking collar 70 is moved right and left against spring 74 in cavity 41. If cavity 41 sifts full of dirt or debris, which is typical for hydraulic tool applications and their environment, locking collar 70 cannot be moved right and left. Obviously, if this happens, one cannot connect and disconnect coupling 10. Thus, in order to prevent dirt from sifting into cavity 41, washer seal 61 is placed within locking collar 70 so that cavity 41 is completely surrounded by cylindrical body 54, locking sleeve 81, locking collar 70 and washer 61. The front face of washer 61 abuts an outer shoulder 55 of cylindrical body 54 and the rear face abuts the annular frontal face of low pressure fitting 63. As mentioned above, washer seal 61 has an outer surface that matches the inner contour of locking collar 70, and is free to rotate with same. During connection, use, and disconnection of coupler 10, washer 61 remains in contact with the front annular edge of second low pressure hose fitting 63, the inner surface of locking collar 70 and the outer surface of body 54, and sealingly isolates a cavity 41 within locking collar 70.

Figure 8:
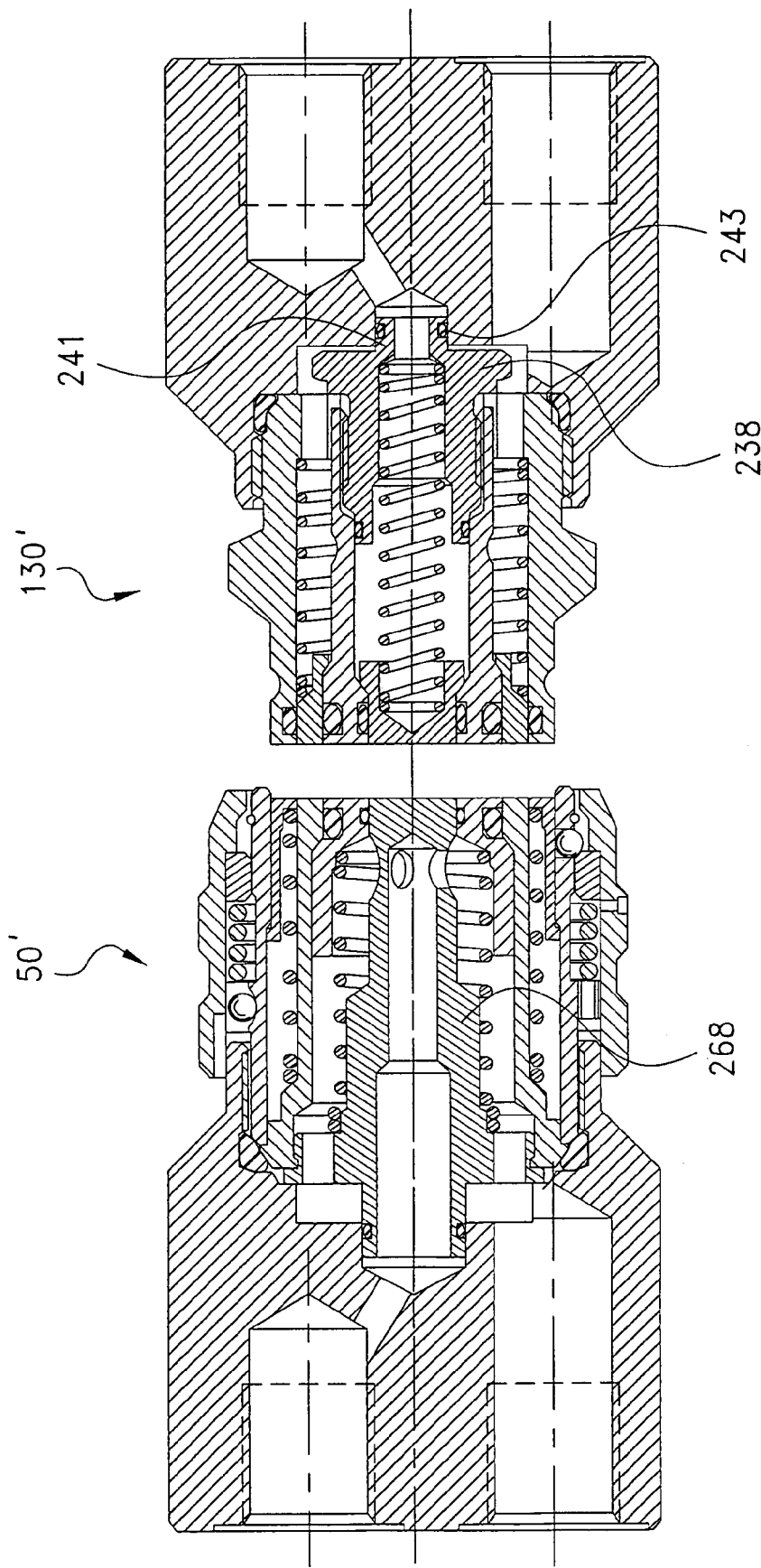
FIG. 8 is a longitudinal sectional view of a further embodiment of the present invention shown with separated male and female halves.
Figure 9:
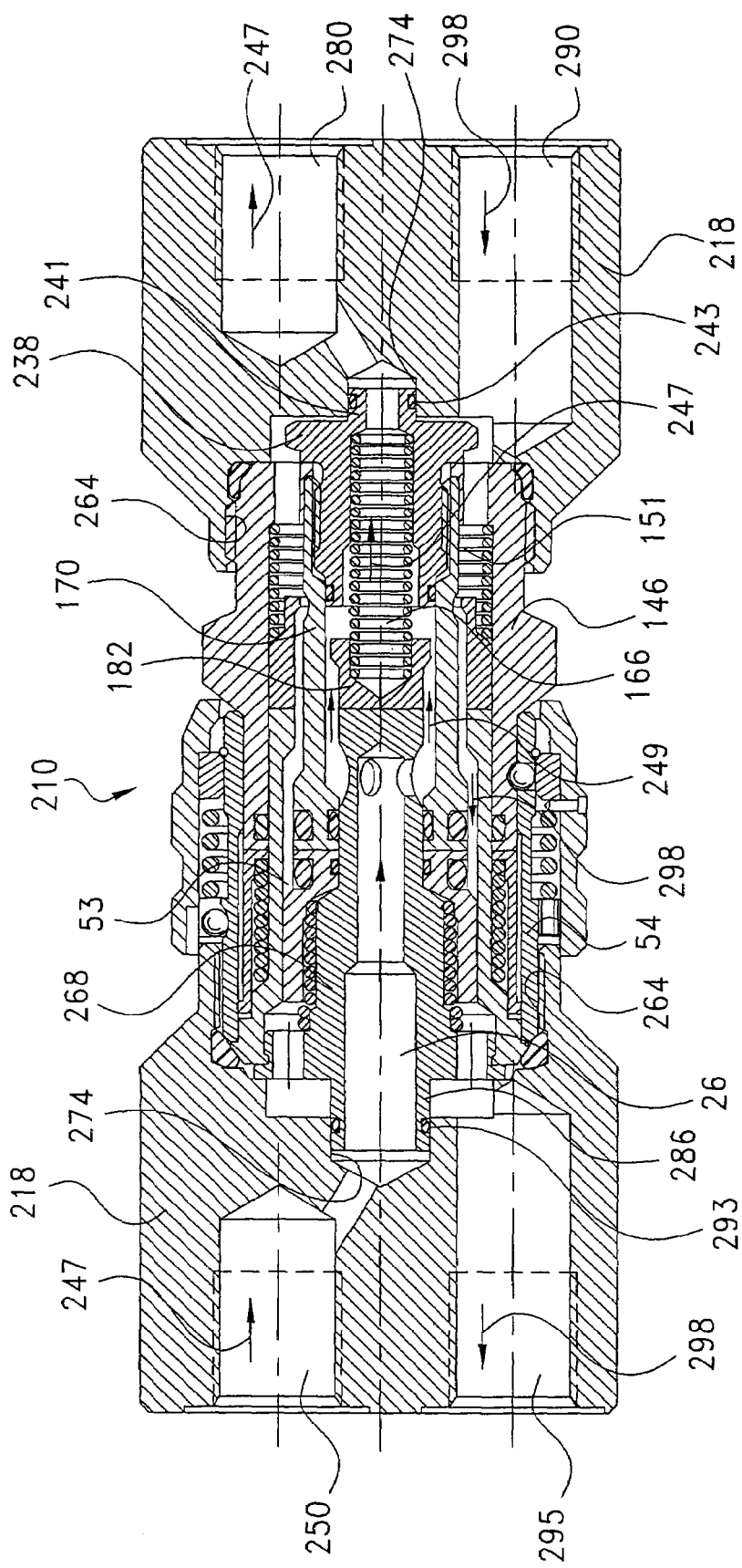
FIG. 9 is a longitudinal sectional view of the further embodiment shown in FIG. 8 shown as a connected coupling.

FIGS. 8 and 9 show a further embodiment 210 of a coupling in which male half 130' and connected female half 50' are mated with "Y" configuration fittings instead of coaxial end fittings 138, 143, 58, 63. Embodiment 210 provides for a connection of male 130' and female 50' halves to two conventional hoses (rather than the coaxial version detailed above). For example, a user may have a coaxial power unit and a conventional two hose hydraulic tool. Embodiment 210 enables the user to connect the two systems by using the coaxial fittings on one coupling half and the "Y" fitting on the other coupling half. FIGS. 8 and 9 show both the "Y" fitting on both halves since the coaxial fittings were already described above. The majority of the componentry of male 130' and female 50' halves is identical to that of the description above, with reference to male 130 and female 50 halves, so, for the sake of brevity, it will not be totally re-addressed here.

FIG. 8 shows male 130' and female 50' halves prior to connection. Male half 130' is connected to a high pressure male adapter 238 that is substantially similar to high pressure hose fitting 138 discussed above, except that adapter 238 does not have a barbed nipple 139 as does fitting 138. Rather, adapter 238 has a truncated nose 241 with an external groove that houses an O-ring 243. A twin line coupling 218 is attached to male half 130' and adapter 238 similar to the attachment of second low pressure hose fitting 63 in the embodiment of FIG. 1. Twin line coupling 218 has internal threads 264 at its front end which mate with external threads on cylindrical plug 146. Upon threading twin line coupling 218 onto male half 130, truncated nose portion 241 is sealingly received within a bore 274 in the center of twin line coupling 218. O-ring 243 provides a seal for the connection between adapter 238 and twin line coupling 218. Unlike coaxial coupling 10 which is connected with a coaxial conduit and has aligned passages between the coupling and conduit, high pressure internal passage 166 is routed to fluidly connect with a twin line high pressure passage 280. Similarly, low pressure fluid passage 151 is connected with a twin line low pressure passage 290.

Female half 50' has essentially the same componentry as described with coaxial coupling 10, except that high pressure inner valve 268 has a nose portion 286 with an external groove that houses a seal, or O-ring 293. As with the connection to male half 130', twin line coupling 218 is threaded onto external threads on cylindrical body 54. When attached, nose portion 286 is sealingly received within bore 274. O-ring 293 prevents any fluid from escaping the high and low pressure passages. High pressure internal passage 26 is routed to fluidly connect with twin line high pressure passage 250. Low pressure fluid passage 53 is connected with twin line low pressure passage 295.

High pressure fluid (e.g. from an external pump) enters high pressure passage 250 in coupling 218 and takes the path indicated by flow arrow 247. Specifically, fluid flows through passage 26 within female half 50, around valve element 182 (indicated by flow arrow 249), through inside passage 166; and out through twin line coupling passage 280. Similar to the fluid flow paths in coaxial coupling 10, flow 247 would travel to the hydraulic tool and would return (as low pressure return flow 298) from the hydraulic tool through low pressure passage 290. Again, specifically, flow 298 continues through fluid passage 151 within cylindrical plug 146; through passage 53 within cylindrical sealing sleeve 84; out low pressure passage 295; and back to the reservoir.

It should be noted that the present invention is not limited to the specified preferred embodiments and principles. Those skilled in the art to which this invention pertains may formulate modifications and alterations to the present invention. These changes which rely upon the teachings by which this disclosure has advanced are properly considered within the scope of this invention as defined by the appended claims.

What is claimed is:

1. A method of operatively, fluidly and concentrically interconnecting adjoining proximate ends of self-contained subassemblies comprised of first and second coaxial coupling halves, with the distal end of each of said coupling halves being operatively, fluidly interconnected with a separate hose assembly that includes a flexible hose assembly having multiple conduits, each of said conduits being, in turn, connected with an individual hose fitting, said coupling halves, together with their respective hose assemblies which, upon being finally fluidly connected, form a coupling assembly between a driving member and a driven member, said method comprising the steps of:
   a. initially maintaining an operative fluid connection between concentric inner and outer passages of said first coupling half, connected, via separate ones of said multiple conduits and hose fittings, to said driving member, while concurrently isolating concentric inner and outer passages of said second coupling half, connected, via further separate ones of said multiple conduits and hose fittings, to said driven member, said coupling halves being coaxially aligned;
   b. fluidly connecting one of said second coaxial coupling member inner and outer passages with one of said first coaxial coupling member inner and outer passages in order to relieve any residual pressure buildup in said second coaxial coupling member; and
   c. finally fluidly interconnecting said first and second coaxial coupling member inner passages and said first and second coaxial coupling member outer passages, thereby empowering said driven member.

2. A method of fluidly connecting a first coaxial coupling (50) and a second coaxial coupling (130), both having a concentric inner (26, 166) and outer passage (53, 151) respectively, said method comprising the steps of:
   a. initially fluidly connecting said first coaxial coupling inner (26) and outer (53) passages with each other while isolating both of said second coaxial coupling inner (166) and outer passages (151); then;

b. fluidly connecting one of said second coaxial coupling inner (166) and outer (151) passages with said initially connected first coaxial coupling inner (26) and outer (53) passages; and c. finally isolating said initially connected first coaxial coupling inner (26) and outer (53) passages and fluidly coupling the other of the second coaxial coupling inner (166) and outer (151) passages so as to fluidly connect said first coaxial coupling inner passage (26) with said second coaxial coupling inner passage (166) and said first coaxial coupling outer passage (53) with said second coaxial coupling outer passage (151).

3. The method as in claim 2 further including the steps of:

a. conducting high pressure fluid via said first and second coupling inner passages (26, 166); and b. conducting low pressure fluid via said first and second coupling outer passages (53, 151).

4. A method of fluidly connecting coaxially aligned first and second couplings (50, 130), wherein said first coupling (50) has an inner high pressure passage (26) and a coaxial outer lower pressure passage (53), and said second coupling (130) has an inner high pressure passage (166) and a coaxial outer lower pressure passage (151), said method comprising the steps of:

a. firstly fluidly connecting said first coupling inner high pressure passage (26) with said first outer lower pressure passage (53) while isolating said second coupling inner high pressure passage (166) and said coaxial outer lower pressure passage (151); then b. fluidly connecting said first coupling inner high pressure passage (26) and one of said second coupling inner high pressure passage (166) and said second coupling coaxial outer lower pressure passage (151) with said first coupling coaxial outer lower pressure passage (53) while isolating the other of said second coupling inner high pressure passage (166) and said second coupling coaxial outer lower pressure passage (151); and c. finally fluidly connecting said first coupling inner high pressure passage (26) with said second coupling inner high pressure passage (166) and said first coupling coaxial outer lower pressure passage (53) with said second coupling coaxial outer lower pressure passage (151).

5. A method of fluidly connecting a first coaxial coupling (50) and a second coaxial coupling (130), wherein said first coaxial coupling (50) has an inner high pressure passage (26) and an outer lower pressure passage (53), and said second coaxial coupling (130) has an inner high pressure passage (166) and an outer lower pressure passage (151), said method comprising the steps of:

a. initially fluidly connecting said first coupling inner high pressure passage (26) with said first coupling coaxial outer lower pressure passage (53) while isolating said second coupling inner high pressure passage (166) and said second coupling coaxial outer lower pressure passage (151); then b. fluidly connecting both of said second coaxial coupling high and coaxial lower pressure passages (166, 151) with said first coaxial coupling coaxial outer lower pressure passage (53); and c. finally fluidly connecting said first coaxial coupling inner high pressure passage (26) with said second coaxial coupling inner high pressure passage (166) and said first coaxial coupling outer low pressure passage (53) with said second coaxial coupling outer low pressure passage (151).

6. A method of providing a continuous flow of high pressure fluid through a first coaxial coupling half (50) while fluidly connecting said first coaxial coupling half (50) to a second coaxial coupling half (130), wherein said first coaxial coupling half (50) includes a high pressure passage (26) and a coaxial lower pressure passage (53), and said second coaxial coupling half (130) includes a high pressure passage (166) and a coaxial lower pressure passage (151), said method comprising the steps of:

a. initially maintaining the fluid connection between said first coaxial coupling half high pressure passage (26) and said first coaxial coupling half lower pressure passage (53) while isolating said second coaxial coupling half high pressure passage (166) and said second coaxial coupling half lower pressure passage (151); then b. additionally fluidly connecting said first coaxial coupling half high pressure passage (26) and at least one of said second coaxial coupling half high pressure passage (166) and said second coaxial coupling half lower pressure passage (151) with said first coaxial coupling half lower pressure passage (53); then c. fluidly connecting said first coaxial coupling half high pressure passage (26) with said second coaxial coupling half high pressure passage (166) and said first coaxial coupling half coaxial lower pressure passage (53) with said second coaxial coupling half coaxial lower pressure passage (151).

* * * * *